United States Patent [19]

Tannenlaufer

[11] Patent Number: 4,638,679
[45] Date of Patent: Jan. 27, 1987

[54] ADJUSTING MECHANISM FOR A BOWDEN CABLE

[75] Inventor: Gerd Tannenlaufer, Remscheid, Fed. Rep. of Germany

[73] Assignee: Ford Motor Company, Dearborn, Mich.

[21] Appl. No.: 611,458

[22] Filed: May 17, 1984

[30] Foreign Application Priority Data

Jun. 11, 1983 [DE] Fed. Rep. of Germany ....... 3321187

[51] Int. Cl.⁴ .............................................. F16C 1/10
[52] U.S. Cl. ..................................... 74/501 R; 74/502
[58] Field of Search .................. 74/501 R, 108, 506, 74/502; 180/335

[56] References Cited

U.S. PATENT DOCUMENTS

| | | | |
|---|---|---|---|
| 1,436,706 | 11/1922 | Galamb | 180/335 |
| 1,713,842 | 5/1929 | Link | 74/502 |
| 4,409,861 | 10/1983 | Sakurai | 74/501 R |

FOREIGN PATENT DOCUMENTS

| | | | |
|---|---|---|---|
| 2004614 | 4/1979 | United Kingdom | 74/501 R |
| 2092696 | 8/1982 | United Kingdom | 74/501 R |

Primary Examiner—Gary L. Smith
Assistant Examiner—Rodney M. Lindsey
Attorney, Agent, or Firm—Daniel M. Stock; Clifford L. Sadler

[57] ABSTRACT

An adjusting mechanism for a Bowden cable, in particular for heating and ventilation flaps in a motor vehicle, is described in which the outer cable sleeve is connected to a casing and the inner cable 17 is connected to a flexible push and pull element 5 guided in the casing. The push and pull element 5 is connected to a sector-shaped lever arm 4 to which is further connected by way of a pin 24 a second flexible push and pull element 6. The latter push and pull element 6 is guided in a second guide 15,16 and is displaceable by a control knob 22 which moves along an essentially liniar path.

3 Claims, 4 Drawing Figures

ADJUSTING MECHANISM FOR A BOWDEN CABLE

BACKGROUND OF THE INVENTION

1. Field of Invention

The invention relates to an adjusting mechanism for a Bowden cable, in particular for adjusting the heating and ventilation flaps in a motor vehicle.

2. Description of the Prior Art

In German Offenlegungsschrift No. 31 04 482, there is described an adjusting mechanism for a Bowden cable in which the Bowden cable sleeve is connected to a casing and the inner cable is connected to a flexible push and pull element guided in the casing and displaceable by means of a drum rotatable in the casing. In this case the rotatable drum is operated by means of a manually rotatable control knob connected to the drum. In certain applications, however, it is preferred to provide an essentially linear of movement of the control knob to permit finer setting, the object of the invention being to provide such a mechanism.

SUMMARY OF THE INVENTION

According to the present invention, there is provided an adjusting mechanism for a Bowden cable in which the Bowden cable sleeve is connected to a casing and the inner cable is connected to a flexible push and pull element guided in an arcuate guide in the casing, wherein a lever arm pivotable relative to the casing is connected to the push and pull element, which lever arm is connected further to a second flexible push and pull element which is displaceable along a second guide by means of a control knob movable along a substantially linear path.

The lever arm may conveniently be sector-shaped and may define part of the guide for the first push and pull element. The point of attachment to the second push and pull element is preferably further from the pivot axis of the lever arm than the point of connection to the first element thereby providing a mechanical advantage to reduce the force required to move the control knob.

Advantageously, the casing is made integrally with laterally projecting webs defining open guides for the two flexible push and pull elements and with a pivot journal for the lever arm. Such construction simplifies production and assembly.

BRIEF DESCRIPTION OF THE DRAWINGS

The invention will now be described further, by way of example, with reference to the accompanying drawings, in which.

DESCRIPTION OF THE PREFERRED EMBODIMENT

Figure 1:
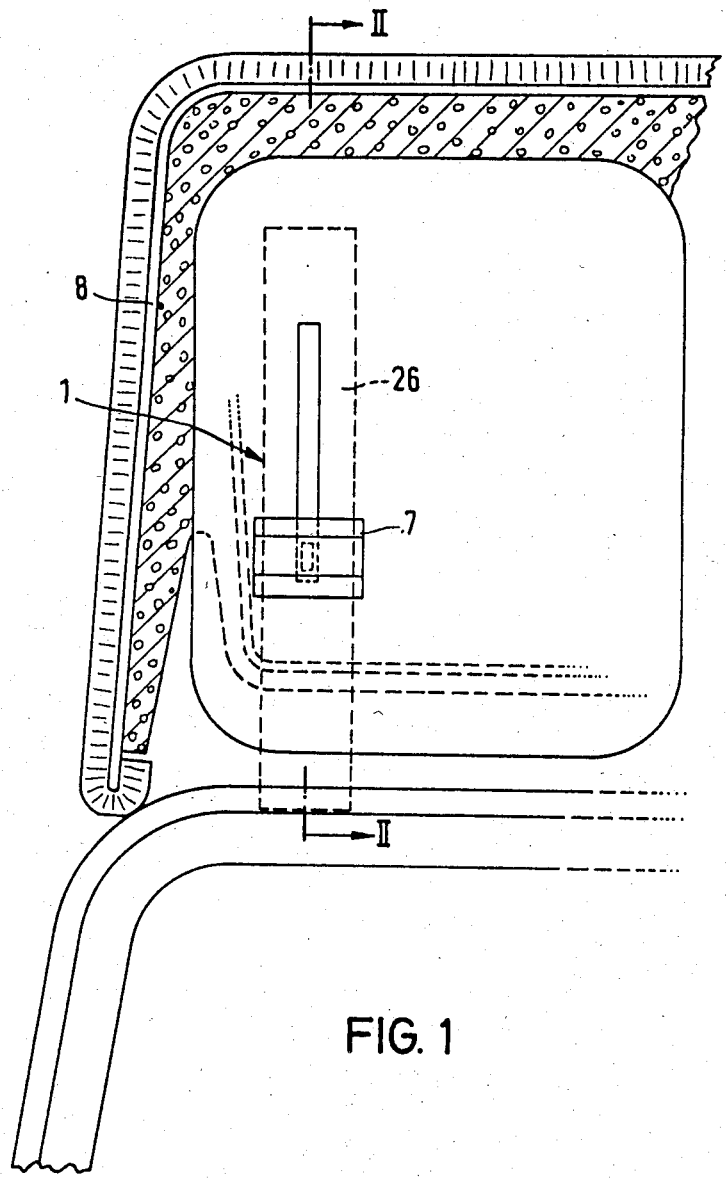
FIG. 1 is an end elevation of an adjusting mechanism according to the invention.

The adjusting mechanism 1 for a Bowden cable 2 essentially consists of only five parts, namely, a casing 3, a sector-shaped lever arm 4, first and second flexible push and pull elements 5 and 6, and a control knob 7. The adjusting mechanism 1, as may best be seen in FIGS. 1 and 2, is supported by a bracket 8 disposed on the transmission tunnel of a motor vehicle and allows passengers sitting in the rear of the motor vehicle convenient setting of heating and ventilation flaps which control the flow of air into the leg room in front of the rear seats.

Figure 2:
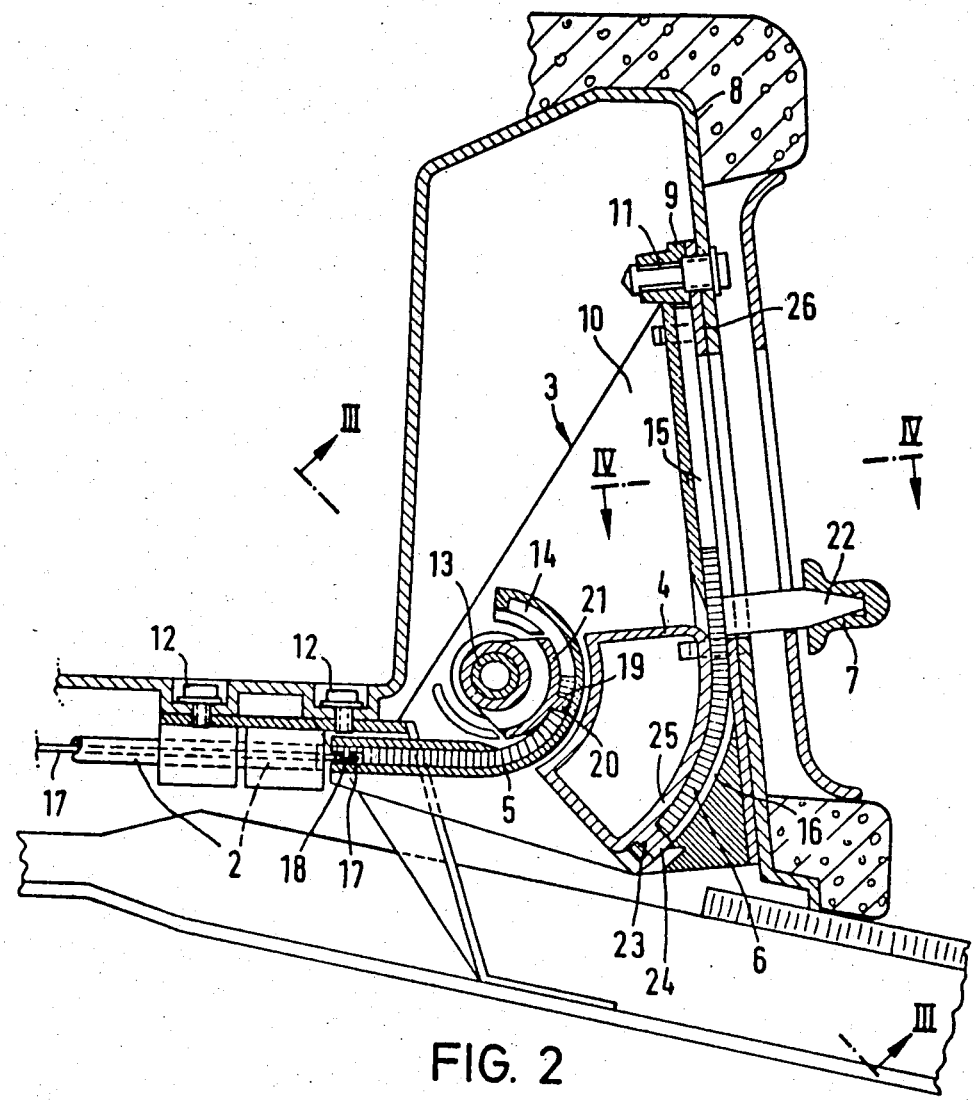
FIG. 2 is a partial vertical section along the line II—II in FIG. 1.
Figure 3:
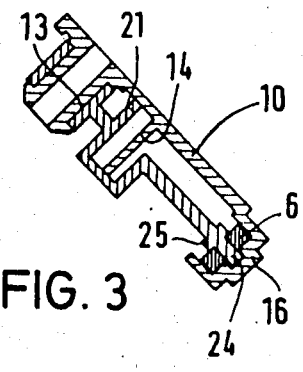
FIG. 3 is a section along the line III—III in FIG. 2.
Figure 4:
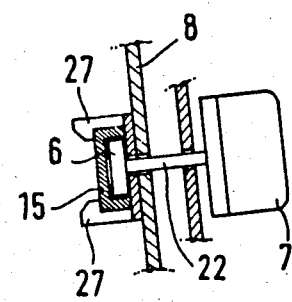
FIG. 4 is a section along the line IV—IV in FIG. 2.

The design of the individual components and their interaction is shown in greater detail in FIGS. 2 to 4. The casing 3 comprises an essentially rectangular base plate 9 and a triangular side wall 10 extending at right angles to the base plate. Fastening means 11 and 12 are provided on the base plate 9 for facilitating attachment to the bracket 8.

A pivot journal or bearing 13 which receives the sector-shaped lever arm 4 is formed on the side wall 10 of the casing 3 at right angles thereto. Additionally, webs extending at right angles to the side wall 10 define an arcuate guide 14 for the first flexible push and pull element 5 and a guide for the second flexible push and pull element 6, the guide having a straight section 15 and an arcuate section 16.

The first flexible push and pull element 5 is connected at one of its ends by way of a pin 18 to the inner cable 17 of Bowden cable 2 and at the other of its ends engages by way of a bore 19 with a radial pin 20 carried on a web 21 of the lever arm 4. The web 21 forms part of one wall of the guide 14.

The second flexible push and pull element 6 is connected at one of its ends by way of an arm 22 extending at right angles thereto to the control knob 7 and at the other of its ends is connected by way of a bore 23 to a pin 24 which forms part of the guide for the second flexible push and pull element 6.

A cover plate 26, which forms part of straight section 15 of the guide for the second flexible push and pull element 6 in the straight-line region, is provided between the base plate 9 of the casing 3 and the bracket 8. The cover plate 26 may be provided with appropriate symbols to facilitate the setting of the control knob 7 and may, where appropriate, be made of translucent material in conjunction with suitable illumination. The cover plate 26 may be joined to the guide 15 in a simple manner by resilient barbs 27.

As is evident from FIG. 2 in particular, the adjusting mechanism may be designed in such a way that bending of the inner cable 17 does not occur. In this way, easy actuation of the Bowden cable is ensured. The pivoting movement necessary for opening a flap is performed by the push and pull element 5 consisting of an appropriate flexible material, a reduction in the actuating forces of the adjusting knob 7 being made possible by the lever ratio provided between the lever arm of the first push and pull element 5 and the lever arm of the second push and pull element 6.

Furthermore, the use of the second flexible push and pull element 6 allows the pivoting movement provided for operating the flaps to be converted into straight-line movement to be transmitted to a slightly curvilinear convex-concave path, so that a considerable degree of freedom is made possible in the styling of the bracket 8.

The adjusting mechanism according to the invention may, of course, be used in an equally advantageous manner in the region of the dashboard of a motor vehicle.

I claim:

1. An adjusting mechanism for a Bowden cable having an outer sleeve and an inner cable comprising a casing connected to the sleeve, a first flexible push and pull element carried for guided movement with respect to the casing and connected to the inner cable, a first arcuate guide carried with the casing for guidingly receiving the first push and pull element, a lever arm pivotally mounted with respect to the casing and connected to the first push and pull element, a second flexible push and pull element connected to the lever arm, and a second arcuate guide carried with the casing and having a straight section and receiving the second push and pull element to permit movement of the second push and pull element in response to movement of a control knob connected thereto along a substantially linear path.

2. An adjusting mechanism according to claim 1, wherein the casing is made integrally with laterally projecting webs defining open portions of the two guides for the two flexible push and pull elements and with a pivot journal for the lever arm.

3. An adjusting mechanism according to claim 2, wherein the guides for the first and second push and pull elements are further defined in part by surfaces of the lever arm.

* * * * *